United States Patent [19]
Looker et al.

[11] Patent Number: 5,241,777
[45] Date of Patent: Sep. 7, 1993

[54] WIND POWERED MOLE CONTROL DEVICE

[75] Inventors: Olin L. Looker, Milford; Michael J. Smith, Chebanse, both of Ill.

[73] Assignee: Looker, Inc., Milford, Ill.

[21] Appl. No.: 845,671

[22] Filed: Mar. 4, 1992

[51] Int. Cl.⁵ .......................................... A01M 29/02
[52] U.S. Cl. ........................................... 43/124; 43/1; 116/22 A; 446/217
[58] Field of Search ........................... 43/1, 124, 98; 116/22 A; 446/217, 218

[56] References Cited

U.S. PATENT DOCUMENTS

| | | | |
|---|---|---|---|
| 333,611 | 1/1886 | Daveggio | 116/22 A |
| 733,778 | 11/1902 | Weber | 116/22 A |
| 966,950 | 8/1910 | Puha | 116/22 A |
| 1,953,677 | 4/1934 | Glover | 116/22 A |
| 3,073,284 | 1/1963 | Roberts | 43/1 |
| 3,093,761 | 6/1963 | Case | 43/124 |
| 3,252,241 | 5/1966 | Gould | 446/217 |
| 4,366,562 | 12/1982 | McGunty | 43/124 |
| 4,758,197 | 7/1988 | Lee | 446/217 |

FOREIGN PATENT DOCUMENTS

| | | | |
|---|---|---|---|
| 269545 | 3/1969 | Austria | 116/22 A |
| 2581506 | 11/1986 | France | 116/22 A |
| 44729 | 12/1938 | Netherlands | 116/22 A |
| 630910 | 10/1949 | United Kingdom | 116/22 A |
| 1016324 | 1/1966 | United Kingdom | 116/22 A |
| 1468275 | 3/1977 | United Kingdom | 116/22 A |

OTHER PUBLICATIONS

"Klippety Klop Mole Control," Alsto Handy Helpers mail order catalog, Autumn 1990.
"Gopher-It," Handsome Rewards, 19465 Brennan Avenue, Perris, Calif. 92379 advertisement.

Primary Examiner—Kurt C. Rowan
Attorney, Agent, or Firm—Roberts and Quiogue

[57] ABSTRACT

A wind-powered mole control device, including a propeller driven shaft on which a clapper is eccentrically loosely mounted. A metal rod extends adjacent the clapper and shaft, and is in communication with the ground. As the shaft is turned by the wind, the clapper strikes the rod end, and rides over the rod end. The striking of the rod and the clapper creates a metallic noise which is repeated as the shaft is turned in the wind, and tends to repel moles.

17 Claims, 1 Drawing Sheet

U.S. Patent     Sep. 7, 1993     5,241,777
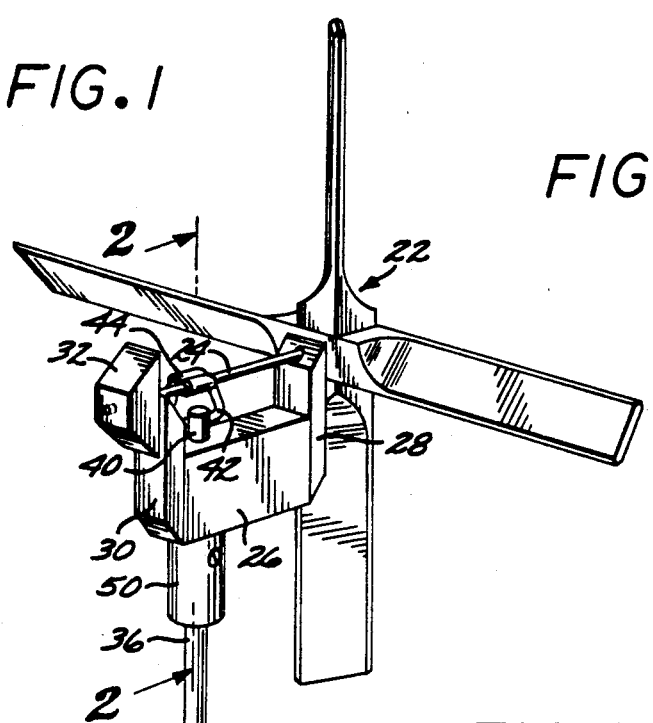
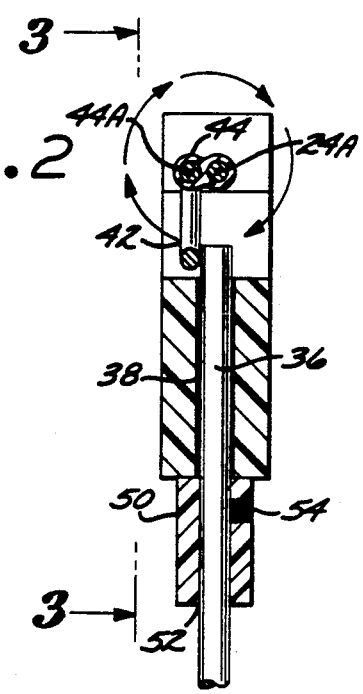
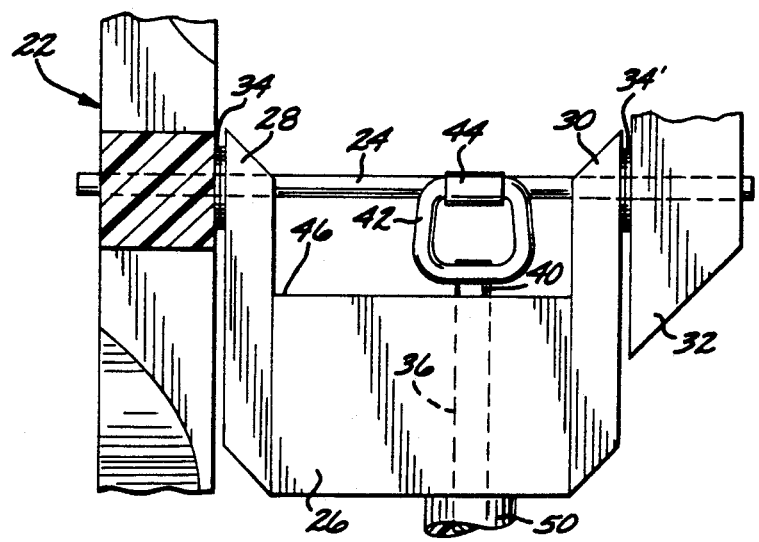
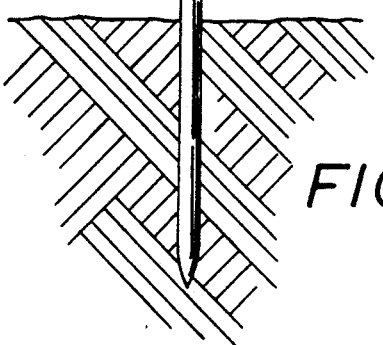
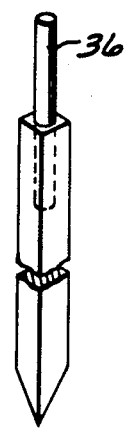
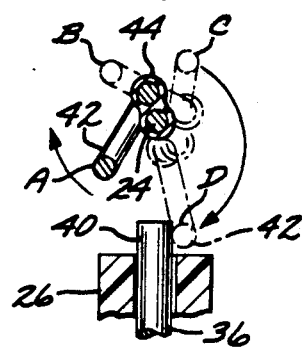

WIND POWERED MOLE CONTROL DEVICE

BACKGROUND OF THE INVENTION

The present invention relates to the control of moles and other burrowing animals.

There are many types of known mole control devices. For example, people have devised various types of traps and mole killing apparatus. More recently, sound generating apparatus have been devised which emit sounds which are intended to drive the mole away from the vicinity of the sound. Such apparatus may employ electronic sound generating circuits, powered by batteries. However, the efficiency of such apparatus can be questionable, the electronic components can drive up the cost, and the use of batteries adds to the expense and requires periodic attention.

It is therefore an object of this invention to provide a mole control apparatus which does not depend on electrical power to operate, and which is powered by the wind.

SUMMARY OF THE INVENTION

In accordance with the invention, a wind powered mole control device is provided, wherein a propeller is mounted on a propeller shaft for rotation by the wind. A fixture supports the shaft and permits relatively free rotation of the shaft. The fixture is in turn supported on a rod extending from the ground, and is coupled to the rod in such a way as to be freely rotatable on the rod so that the fixture and propeller assembly follows the direction of the incident wind. In accordance with the invention, a clapper member is mounted to the shaft in a manner to permit free rotation of the clapper through a range of movement about an axis offset from the shaft axis, the position of which is fixed relative to said shaft axis. A metal rod extends upwardly from the ground, and has a rod end adjacent the shaft and the clapper member, in a position so that as the shaft is turned by the propeller, the clapper is rotated with the shaft and strikes the rod end. Sufficient clearance is provided between the shaft and the rod to permit the clapper to ride over the rod end as the shaft is rotated. The striking of the clapper against the rod end generates a metallic sound which is transmitted into the ground via the rod. The sound is repeated as the wind turns the propeller, and thereby tends to repel moles from the vicinity of the device.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a perspective view illustrative of an exemplary mole control device in accordance with the invention.

FIG. 2 is a cross-sectional view taken along line 2—2 of FIG. 1.

FIG. 3 is a partial side elevation view taken of the portion of the device indicated by line 3—3 of FIG. 2.

FIG. 4 depicts the movement of the device clapper as the device propeller turns in the wind.

FIG. 5 shows the rod fitted into a bore in the end of a wooden stake.

DETAILED DESCRIPTION OF THE PREFERRED EMBODIMENT

A preferred embodiment of a mole control device 20 embodying the present invention is shown in FIG. 1. The device includes a propeller 22 which is fixedly mounted on a metal propeller shaft 24. The metal shaft is in turn mounted in holes bored in the upwardly extending legs 28 and 30 of a U-shaped fixture 26. In this exemplary embodiment, the propeller 22 is fabricated of wood, and is a four-bladed propeller.

As best shown in FIG. 3, the propeller 22 is press-fitted onto the end of the shaft 24. To secure the shaft in position on the fixture 26, a wood block is press-fitted onto the other end of the shaft 24. Respective pairs of washers 34 maintain proper separation of the legs 28 and 30 from the propeller 22 and the block 32.

The U-shaped fixture 26 is in turn rotatably mounted on an upright member, in this embodiment a metal rod 36, which extends through a hole 38 formed in the horizontal member comprising the fixture 26. In accordance with the invention, an end 40 of the rod 36 protrudes above the surface 46 of the fixture 26, so as to be contacted by a striking member or clapper which is eccentrically affixed to the shaft 24 by a block 44. The clapper 42 is formed of a piece of metal rod stock, bent into a closed shape, in this embodiment a rounded trapezoidal shape. The block 44 is secured tightly, e.g., by a press fit, to the shaft 24. However, the clapper 42 fits loosely within the block 44, permitting the clapper to swing freely about its axis 44A inside the block 44.

The fixture is supported by a collar 50. The rod 36 extends through an opening 52 formed in the collar 50. A set screw 54 locks the collar 50 in position relative to the rod end 40. The collar preferably is fabricated of plastic, and provides a relative low friction support on which the fixture 26 ca turn with the relative wind.

The distance the rod end 40 extends above the surface 46 of the fixture 26 and the size of the clapper 42 are selected so that, as the propeller turns in the wind, and the shaft 24 turns, thereby also rotating the clapper about the shaft 24, the clapper will strike the rod end 40. As the shaft 24 continues to turn, the clapper will swing or rotate within the block 44 and ride over the end of the rod. Therefore, there must be a clearance between the rod end and the clapper as the clapper rotates against the shaft 24. Because the clapper and rod 36 are formed of metal, the striking of the clapper and rod causes a metal-lic sound, and there is also a scraping sound as the clapper scrapes over the rod end as the shaft 24 rotates. These sounds are in turn transmitted by the rod 36 into the ground. The sounds are repetitive, due to the turning of the propeller in the wind. The sounds are found to be useful in repelling moles.

The rotation action of the clapper relative to the shaft and the rod end is further illustrated in FIG. 4. A particular advantage of the clapper arrangement illustrated is that the clapper is coupled to the propeller shaft through a relatively short effective lever arm. Since the clapper rotates freely about its axis 44A, the weight of the clapper bears on the shaft 26 through a relatively smaller lever arm extending from the shaft axis than would be the case if the clapper extended rigidly outwardly from the shaft axis.

The sound energy per unit time transmitted into the ground rises exponentially (approximately as a cubic function) as the wind velocity (propeller speed) increases. This is because the number of clapper impacts per unit time increases directly with the increase in wind or propeller speed, and the velocity of impact between the clapper and rod end increases as the wind and propeller speed increases. The kinetic energy of each impact increases with the square of the velocity of the impact, since the energy of impact is proportional to the mass of the clapper times the velocity of impact squared. Therefore, the total sound energy transmitted into the ground is proportional to the propeller velocity (or wind velocity) times velocity squared, or approximately a cubic function of the wind velocity.

Another advantage of the device of this invention has to do with the manner in which kinetic energy is stored in and released from the clapper. At very low wind speeds, when the propeller rotates very slowly in the energy storage part of the cycle, potential energy is slowly increased in the clapper as the clapper is slowly raised in elevation. After the clapper is tilted over at the top of the propeller shaft, it falls downwardly, accelerating due to gravity until it hits the rod end, sending a portion of slowly stored but suddenly released energy of the clapper through the rod end and into the ground as sound energy. This is illustrated in FIG. 4, wherein sequential positions A and B of the clapper 42 during the rotation cycle illustrate the energy storage part of the cycle. Position C illustrates the end of the energy storage portion, and the point at which the clapper 42 swings freely and rapidly downward to the initial striking position D. It will be seen that the speed of rotation of the clapper 42 from position A to position C is essentially that of the propeller shaft 24. However, the speed of rotation of the clapper about its axis 44A from position C to D is greatly increased due to the force of gravity. Approximately 270 degrees of propeller rotation is used to store energy into the clapper. Nowhere in the propeller rotation cycle is there a sudden buildup of torque requirement. Thus, the device will operate in a very light wind.

The rod 36 can be inserted directly into the ground, or fitted into a bore in the end of a wooden stake, which is in turn pushed into the ground to support the propeller and fixture in proper position to catch the wind.

The advantages of the mole control device of the present invention include the following:

1. The mole control device includes a striking member, i.e., the clapper, that directly impacts the stake or rod inserted into the ground, thus maximizing the noise energy transmitted into the ground, and moreover achieves this function without regard to the wind direction.

2. The mole control device generates a noise energy transmitted into the ground which increases exponentially with wind speed.

3. The mole control device can be turned backward without any damage.

4. The stall torque of the mole control device is very low, and hence the device will begin to operate in a very low wind. The relatively low stall torque is due to the rotatability of the clapper about its axis offset from the propeller shaft axis, thereby reducing the average lever arm through which the clapper must be rotated by the propeller.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A wind-powered mole control device, comprising:
   a propeller;
   a propeller shaft on which said propeller is mounted for rotation by the wind;
   fixture means for supporting said shaft and permitting free rotation of said shaft as said propeller turns;
   a striking member mounted on said shaft; and
   an upright stake having a ground end extending into the ground, said stake extending upwardly from the ground and having an upper end adjacent said shaft and said striking member, in a position so that as said shaft is turned by said propeller, said striking member directly strikes said stake upper end as said shaft turns;
   whereby the striking of said striking member against said stake upper end generates sound energy which is transmitted directly into the ground via said stake, which repeats as the propeller turns in the wind, and thereby tends to repel moles from the vicinity of said device.

2. The device of claim 1 wherein said fixture means comprises a U-shaped fixture characterized by two upwardly extending legs joined by a substantially horizontal member, wherein said propeller shaft extends through openings formed in said legs, and wherein said upright stake upper end protrudes through an opening formed in said horizontal member.

3. The device of claim 2 wherein said fixture rotates freely about said upright stake to allow the assembly comprising the fixture means, the propeller shaft and the propeller to turn to adjust to changes in the wind direction.

4. The device of claim 1 wherein upright stake and said striking member are each fabricated of a metal.

5. The device of claim 1 wherein upright member comprises a metal rod, and further comprising collar member through which said rod extends, said collar comprising means for supporting said fixture means in an appropriate position relative to the upper end of said rod.

6. The device of claim 1 further comprising means permitting said striking means to ride over said upright member upper end as said shaft is rotated.

7. The mole control device of claim 1 further characterized in that said striking member is a single clapper member eccentrically mounted on said shaft, so that said upright stake is struck only once per complete revolution of said propeller shaft.

8. The device of claim 1 wherein said upright stake comprises a wooden stake element having a first end extending into the ground and a second end above the ground, and a metal rod element inserted into an axial bore formed in said second stake element end, said rod element defining said stake upper end which said striking member directly strikes.

9. A wind-powered mole control device, comprising:
   a propeller;
   a propeller shaft on which said propeller is mounted for rotation by the wind;
   fixture means for supporting said shaft and permitting free rotation of said shaft as said propeller turns;
   a clapper member eccentrically mounted on said shaft, said clapper permitted to rotate freely through a range of movement about a clapper axis offset from and whose position is fixed relative to said shaft, whereby as said propeller shaft is rotated, said clapper member is raised until it is brought over the top of said shaft, and thereafter said clapper member rotates rapidly about said clapper axis swinging rapidly downwardly; and an upright stake extending upwardly from the ground and having an end adjacent said shaft and said clapper, in a position so that as said shaft is turned by said propeller, said clapper directly strikes said stake end as said clapper swings rapidly downwardly, there being sufficient clearance between said shaft and said stake end to permit said clapper to ride over said end as the shaft is rotated, whereby the striking of said clapper against said stake end generates sound energy which is transmitted into the ground via said stake, which repeats as the propeller turns in the wind, and thereby tends to repel moles from the vicinity of said device.

10. The device of claim 9 wherein said clapper member is mounted to said shaft via a block member which is fixedly secured about said propeller shaft such that said block member does not rotate relative to said shaft, and which loosely encircles a portion of said clapper member to permit rotation of said clapper about said clapper axis.

11. The device of claim 10 wherein said clapper member is characterized by a rounded trapezoidal shape, having first and second opposed parallel sides, and wherein said first side comprises said portion of said clapper member loosely encircled by said block member.

12. The device of claim 9 wherein said fixture means comprises a U-shaped fixture characterized by two upwardly extending legs joined by a substantially horizontal member, wherein said propeller shaft extends through openings formed in said legs, and wherein said upright stake end protrudes through an opening formed in said horizontal member.

13. The device of claim 12 wherein said fixture rotates freely about said upright stake to allow the assembly comprising the fixture means, the propeller shaft and the propeller to turn to adjust to changes in the wind direction.

14. The device of claim 9 wherein said upright stake and said clapper are each fabricated of a metal.

15. The device of claim 9 wherein said upright stake comprises a metal rod, and further comprising collar member through which said rod extends, said collar comprising means for supporting said fixture means in an appropriate position relative to the end of said rod.

16. The mole control device of claim 9 further characterized in that only a single clapper member is mounted on said shaft so that said upright stake is struck only once per complete revolution of said propeller shaft.

17. The device of claim 9 wherein said upright stake comprises a wooden stake element having a first end ending into the ground and a second end above the ground, and a metal rod element inserted into an axial bore formed in said second stake element end, said rod element defining said stake end which said striking member directly strikes.

* * * * *